United States Patent
Morita et al.

(10) Patent No.: US 7,280,947 B2
(45) Date of Patent: Oct. 9, 2007

(54) GEAR-DRIVING-SYSTEM DESIGNING SYSTEM

(75) Inventors: Kiwamu Morita, Minamikawachi-gun (JP); Yoshinobu Okumura, Yamatokoriyama (JP); Tomohiko Okada, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 584 days.

(21) Appl. No.: 10/684,262

(22) Filed: Oct. 10, 2003

(65) Prior Publication Data

US 2004/0133404 A1 Jul. 8, 2004

(30) Foreign Application Priority Data

Oct. 11, 2002 (JP) ............................. 2002-299572

(51) Int. Cl.
*G06F 9/455* (2006.01)

(52) U.S. Cl. ............................. 703/6; 703/1; 347/262; 477/107; 399/167

(58) Field of Classification Search ............. 703/6, 703/1, 22, 7; 347/262; 477/107; 399/167; 318/632; 74/460; 73/117.3; 123/192.2; 700/83, 98, 175
See application file for complete search history.

(56) References Cited

U.S. PATENT DOCUMENTS

| | | | | |
|---|---|---|---|---|
| 4,939,985 | A * | 7/1990 | Von Thun | 73/118.1 |
| 6,144,181 | A * | 11/2000 | Rehm et al. | 318/629 |
| 6,202,960 | B1 * | 3/2001 | Travis et al. | 244/103 R |
| 6,282,502 | B1 * | 8/2001 | Sundaresan et al. | 703/1 |
| 6,304,835 | B1 * | 10/2001 | Hiramatsu et al. | 703/7 |
| 6,626,139 | B1 * | 9/2003 | Horita et al. | 123/192.2 |
| 6,799,453 | B2 * | 10/2004 | Miyauchi et al. | 73/117.3 |

(Continued)

FOREIGN PATENT DOCUMENTS

JP 4-48390 8/1992

(Continued)

OTHER PUBLICATIONS

Hsi Lin et al., "A parametric study of spur gear dynamics", The University of Memphis, Jan. 1998.*
Taghirad et al., "Modeling and parameter identification of harmonic drive systems", ASME, 1998.*

(Continued)

*Primary Examiner*—K. Thangavelu
(74) *Attorney, Agent, or Firm*—David G. Conlin; William J. Daley, Jr.; Edwards, Angell, Palmer & Dodge LLP

(57) ABSTRACT

Featured are a system and method for designing a gear driving system. The designing system includes a characteristic setting section, calculating section and comparing section. The calculating section simulates an oscillation that is caused in the final gear of the gear driving system, based on the gear characteristic value(s) set in the characteristic setting section. The comparing section judges whether or not the frequency mid amplitude of the oscillation obtained by the simulation fall within an acceptable range. If the frequency and amplitude do not fall within the acceptable range, the characteristic changing section changes the setting of a gear characteristic value, and the processes of the calculating section and the comparing section, as well as that of the characteristic changing section are repeated until it is judged that one of the frequency or amplitude of the simulated oscillation falls within the acceptable range.

20 Claims, 9 Drawing Sheets

U.S. PATENT DOCUMENTS

| | | | |
|---|---|---|---|
| 6,829,457 B2* | 12/2004 | Ryuzaki et al. | 399/167 |
| 2002/0014172 A1* | 2/2002 | Fujiwara et al. | 101/350.3 |
| 2002/0049118 A1* | 4/2002 | Vornehm et al. | 477/107 |
| 2002/0073795 A1* | 6/2002 | Bodtker et al. | 74/460 |
| 2002/0085086 A1* | 7/2002 | Koide | 347/262 |
| 2002/0112546 A1* | 8/2002 | Shibasaki et al. | 73/781 |
| 2002/0190683 A1* | 12/2002 | Karikomi et al. | 318/632 |
| 2003/0115037 A1* | 6/2003 | Sumida | 703/22 |
| 2003/0183467 A1* | 10/2003 | Kozarekar | 188/380 |

FOREIGN PATENT DOCUMENTS

| | | |
|---|---|---|
| JP | 2000-147948 | 5/2000 |
| JP | 2001-256265 | 9/2001 |

OTHER PUBLICATIONS

Ehinger et al., "A Kiln drive vibration problem and solution", Holnam, Inc, 1993.*

* cited by examiner

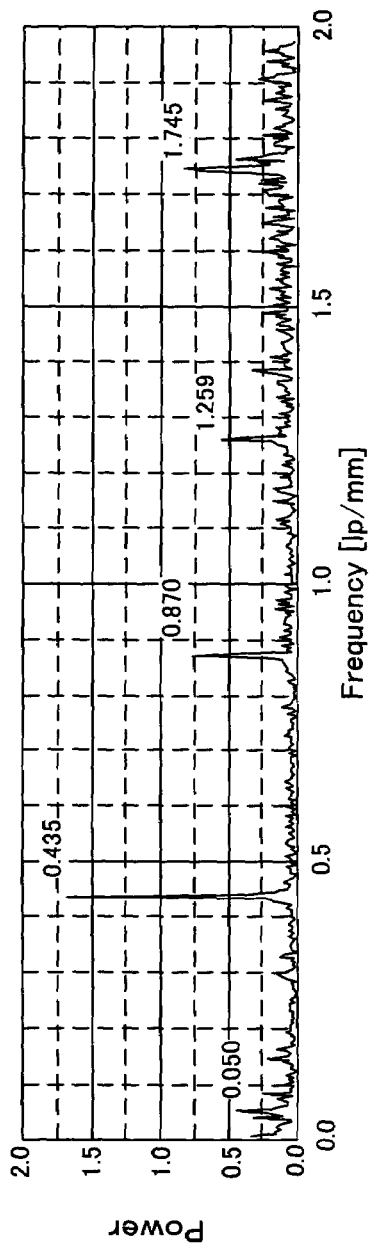
FIG. 6 (a) RESULT OF EXPERIMENT (CURRENT)
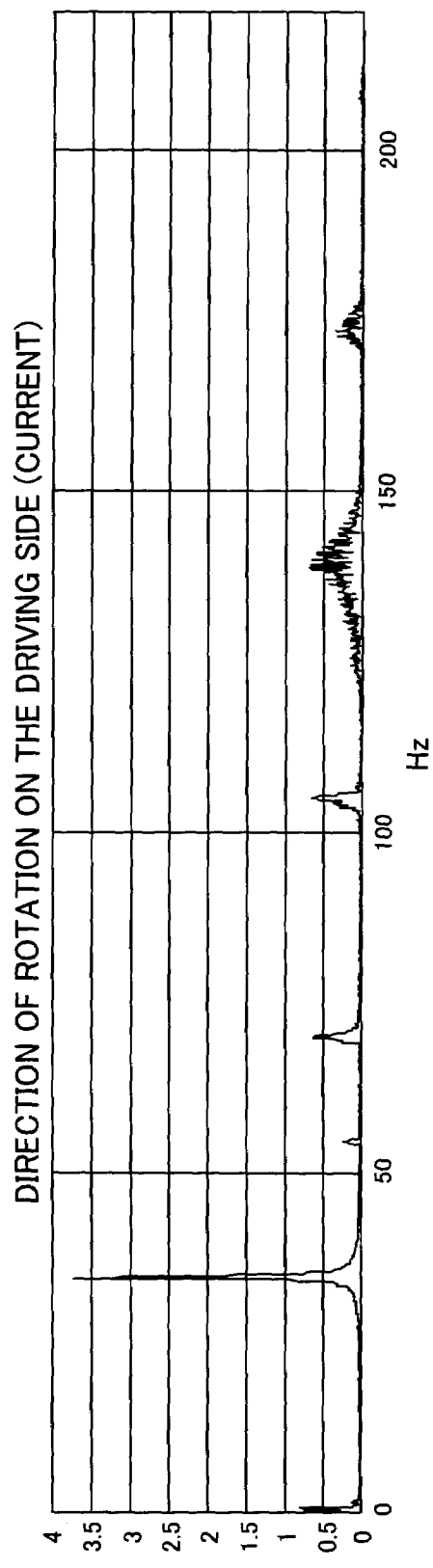
FIG. 6 (b) SIMULATION RESULT (CURRENT)

GEAR-DRIVING-SYSTEM DESIGNING SYSTEM

FIELD OF THE INVENTION

The present invention relates to gear-driving-system designing systems for designing a gear driving system used to transmit a generated driving force of a driving source to driving targets.

BACKGROUND OF THE INVENTION

Various types of apparatuses use a gear driving system that drives a driving target by transmitting a generated driving force of a driving source to the driving target via a driving transmitting member, or more specifically, gears. One of the key factors in the apparatuses using the gear driving system is designing of the gear driving system.

Conventionally, designing of the gear driving system has primarily focused on obtaining gear dimensions and gear materials required to obtain desired characteristics, such as the reduction ratio and torque output, within an available space.

However, the gear designing system so designed, despite a proper reduction ratio or output torque, may cause oscillation in the final gear of the gear driving system when the system is installed in an apparatus for actual applications. More specifically, depending on combinations of the gears, the driving force that rotates the driven gear may not smoothly transmit to the driven gear, with the result that oscillation is caused. Such oscillation is known as, for example, a banding phenomenon.

For example, in an application where the gear driving system is used in a driving section of an image forming apparatus of an electrophotographic type to rotate a photoreceptor roller, the banding phenomenon in the gear driving system causes non-uniformity in the peripheral velocity of the photoreceptor roller, causing unevenness in charging, exposure, and development. Such "pitch unevenness" is also caused when the banding phenomenon occurs in a gear driving system used in a sheet transport system.

In other applications, the banding phenomenon might occur, for example, in a document reading optical system to cause uneven driving. In this case, the moving speed of the optical unit becomes non-uniform, which may produce missing or duplicate part in the read-out image, failing to faithfully read the document.

Further, when the banding phenomenon causes uneven driving in, for example, a driving section of a fixing mechanism, the peripheral velocity of the fixing roller becomes non-uniform, which may cause uneven transfer of heat in the unfixed toner passing the fixing mechanism, with the result that over-fixing or fixing error is caused. Further, this may impair the glossiness of the print.

The banding phenomenon thus impairs print quality in an image forming apparatus, for example.

One example of a structure for reducing the banding phenomenon is Japanese Publication for Examined Patent Application No. 48390/1992 (Tokukouhei 4-48390; published on Aug. 6, 1992), which discloses a structure using helical gears 101 and 102 for a drum gear used as the driving system of a photoreceptor drum, as shown in FIG. 8.

The helical gears 101 and 102 used in this publication are provided to exert a thrust force in a direction of the rotational axis of a photoreceptor drum 103 to maintain the position of the photoreceptor drum 103 in a direction of the axis line. This structure can reduce the banding phenomenon in the driving system because the gear driving system using the helical gears has weaker teeth engagement than the gear driving system using spur gears.

Japanese Publication for Unexamined Patent Application No. 147948/2000 (Tokukai 2000-147948; published on May 26, 2000) discloses a photoreceptor unit for reducing jitter (oscillation) caused by teeth engagement, by using smaller modules for a photoreceptor gear 111 and a photoreceptor linking gear 112, and by using large modules for a photoreceptor linking gear 113, a driving input gear 114, and a driving output gear 115, as shown in FIG. 9.

However, the foregoing conventional structures are associated with the following problems.

Namely, in order to reduce oscillation in the gear driving system to a desired level, the structures disclosed in the foregoing publications Tokukouhei 4-48390 and Tokukai 2000-147948 both require the experience and know-how of a designer. Further, some trial-and-error is required to obtain optimum design conditions. Thus, design efficiency is low in these prior art techniques.

For example, in Tokukouhei 4-48390, while the use of the helical gears may reduce oscillation, it is up to the experience and know-how of the designer to determine characteristics of the gears as to whether, for example, how many teeth should each gear have to minimize oscillation.

Further, in Tokukouhei 4-48390, the use of the helical gears increases the driving load and thus power consumption. That is, it is difficult to optimize the overall characteristics of the driving system, including reducing power consumption.

Further, the helical gears in Tokukouhei 4-48390 and the gears with small modules in Tokukai 2000-147948 are used only for the final gear of the gear driving system. This requires the number of gears to be changed for purposes other than adjusting the reduction ratio of the gears, i.e., for the purpose of changing the type of gear in the final stage of the gear train. This is disadvantageous in realizing smaller apparatuses.

SUMMARY OF THE INVENTION

An object of the present invention is to provide a designing system for designing a gear driving system in which oscillation is suppressed.

In order to achieve this object, a gear-driving-system designing system of the present invention includes: a setting section for setting a gear characteristic value for a gear driving system; a calculating section for simulating an oscillation in a final gear of the gear driving system, based on the gear characteristic value set in the setting section; a judging section for judging whether or not the oscillation in the final gear determined by the simulation in the calculating section is within an acceptable range; and a setting changing section for changing the gear characteristic value set in the setting section, when the judging section judges that the oscillation in the final gear does not fall within the acceptable range.

According to the gear-driving-system designing system, the gear characteristic value set in the gear setting section does not take into account preventing oscillations caused in the gear driving system. The gear-driving-system designing system therefore changes the gear characteristic value to a value that takes into account preventing oscillation in the gear driving system.

Specifically, the calculating section simulates an oscillation in the final gear of the gear driving system, based on the gear characteristic value currently set in the setting section.

From the simulation result, the judging section judges whether or not the oscillation in the final gear is within an acceptable range.

If the oscillation in the final gear falls within the acceptable range, the gear characteristic value currently set in the setting section is used for output as the optimum gear characteristic that takes into account preventing oscillation. On the other hand, if the oscillation in the final gear does not fall within the acceptable range, the setting changing section changes the gear characteristic value set in the setting section.

The processes in the setting changing section, the calculating section, and the judging section are repeated until the judging section judges that the oscillation in the final gear is within the acceptable range. The gear characteristic value set in the setting section is outputted as the optimum gear characteristic when the oscillation in the final gear is judged to fall within the acceptable range. As a result, a gear driving system is designed that takes into account preventing oscillation.

With the gear driving system designed by the gear-driving-system designing system, oscillation can be suppressed for each gear of the gear driving system, without using a helical gear or a gear with a small module.

In order to achieve the foregoing object, a gear-driving-system designing method of the present invention includes: a setting step of setting a gear characteristic value for a gear driving system; a calculating step of simulating an oscillation in a final gear of the gear driving system, based on the gear characteristic value set in the setting step; a judging step of judging whether or not the oscillation in the final gear determined by the simulation in the calculating step is within an acceptable range; and a setting changing step of changing and resetting the gear characteristic value set in the setting step, when the judging step judges that the oscillation in the final gear does not fall within the acceptable range, the setting changing step, the calculating step, and the judging step being repeated until the oscillation in the final gear is judged to fall within the acceptable range in the judging step, and the gear characteristic value being outputted as an optimum gear characteristic when the oscillation in the final gear is judged to fall within the acceptable range.

With this method, as with the gear-driving-system designing system, a gear driving system can be designed that takes into account preventing oscillation for each gear of the gear driving system, without using a helical gear or a gear with a small module.

For a fuller understanding of the nature and advantages of the invention, reference should be made to the ensuing detailed description taken in conjunction with the accompanying drawings.

BRIEF DESCRIPTION OF THE DRAWINGS

FIG. 6(*a*) is a graph showing a result of experiment on the oscillation generated in the actual gear driving system; and FIG. 6(*b*) is a graph representing a frequency spectrum that was calculated by simulation in the gear-driving-system designing system using a gear characteristic value obtained in the actual gear driving system.

FIG. 7(*b*) is a graph showing a result of experiment on the oscillation generated in a gear driving system actually manufactured using the optimum gear characteristic value obtained in the gear-driving-system designing system.

DESCRIPTION OF THE EMBODIMENTS

One embodiment of the present invention is described below with reference to the attached drawings. In this embodiment, an image forming apparatus is described as an example of an apparatus employing a gear driving system designed by a gear-driving-system designing system of the present invention.

The image forming apparatus (color image forming apparatus) described in this embodiment has a tandem structure in which image forming units are disposed side by side in a direction of transport of a recording medium such as recording paper. The color image forming apparatus has two switchable modes: a monochromatic image forming mode, in which only a single image forming unit is used to form an image; and a polychromatic mode, in which a plurality of image forming units are used to form an image. Switching between the monochromatic image forming mode and the polychromatic image forming mode is made while a recording medium is on a transfer carrier.

Figure 2:
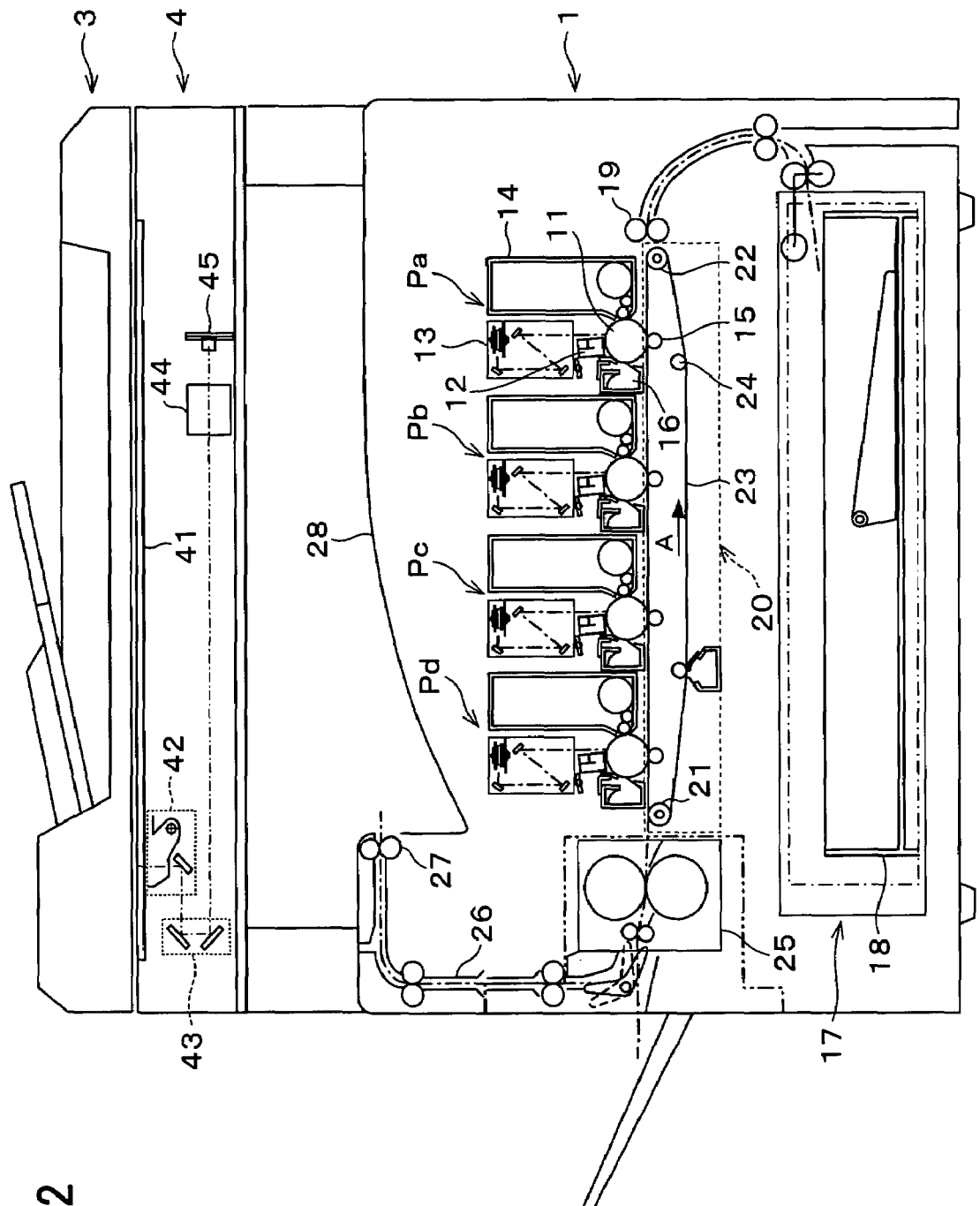
FIG. 2 is a cross sectional view schematically showing an image forming apparatus equipped with a gear driving system designed by the gear-driving-system designing system.

Specifically, as shown in FIG. 2, the color image forming apparatus is equipped with an image forming section 1 and other units, including a double-sided auto document feeder 3 for grabbing a document placed on a document table.

The double-sided auto document feeder 3 transports a document onto a document table 41 of an image reading section 4 in such a manner that one side of the document faces the image reading section 4, enabling the image reading section 4 to read an image on the document. After reading one side of the document, the double-sided auto document feeder 3 may reverse the document to read the other side of the document. The document is ejected after reading the image on one side or both sides of the document. The image reading operation is repeated to read images on the both sides of the next document.

In order to read a document image, the image reading section 4 is disposed beneath the double-sided auto document feeder 3, and includes a first scanning unit 42, a second scanning unit 43, a focusing lens 44, and a photoelectric converting element 45, etc. The document table 41 is also included in the image reading section 4.

The first scanning unit 42 is movably supported on a position opposite the document table 41 on which a document is placed, and includes a light source (not shown) for projecting light on a document through the document table 41, and a mirror for guiding reflected light from the document onto the second scanning unit 43. Further, the first scanning unit 42 moves back and forth at a predetermined speed, parallel to and with a constant distance from a lower surface of the document table 41.

The second scanning unit 43 includes two mirrors, which move back and forth at a constant speed and parallel to the direction of travel of the first scanning unit 42. One of the mirrors faces the mirror of the first scanning unit 42, and the other mirror faces the focusing lens 44.

The focusing lens 44 scales down the reflected light image deflected by the mirrors of the second scanning unit 43, so that the document image is focused on the photoelectric converting element 45. The photoelectric converting element 45 is disposed opposite the second scanning unit 43 with the focusing lens 44 in between, and carries out photoelectric conversion of the focused light image to produce an output electrical signal. The document-image information converted into an electrical signal by the photoelectric converting element 45 is then transferred to an image processing section and processed therein.

The image forming section 1 is provided with four image forming units Pa through Pd. The image forming unit Pa includes a photoreceptor drum 11, a charger 12, a laser beam scanner 13, a developing device 14, a transfer discharger 15, and a cleaning device 16. The charger 12, the developing device 14, the transfer discharger 15, and the cleaning device 16 are disposed around the photoreceptor drum 11. The other image forming units Pb through Pd have similar structures to the structure of the image forming unit Pa.

In each of the image forming units Pa through Pd, the charger 2 uniformalizes the surface of the photoreceptor drum 11, and the laser beam scanner 13 provided above the photoreceptor drum 11 writes an electrostatic latent image on the photoreceptor drum 11. The laser beam scanner 13 includes a semiconductor element (not shown) for emitting image-data-modulated dot light, a deflector for deflecting a laser beam emitted from the semiconductor laser element into the main scanning direction, and a lens and mirror for focusing the deflected laser beam of the deflector onto the surface of the photoreceptor drum 11.

Here, the laser beam scanner section 13 of the image forming unit Pa receives a pixel signal corresponding to the black component of the color document image. The laser beam scanning sections 13 of the image forming units Pb through Pd receive pixel signals of the color components, cyan, magenta, and yellow, respectively. As a result, the image forming units Pa through Pd form electrostatic latent images, corresponding to the converted document-image-information of the respective colors, on their respective photoreceptor drums 11.

The developing device 14 develops the electrostatic latent image formed on the photoreceptor drum 11, and the transfer discharger 15 transfers the developed toner image on the photoreceptor drum 11 onto a recording medium. The cleaning device 16 removes residual toner on the photoreceptor drum 11.

The developing devices 14 of the image forming units Pa through Pd contain toners of black, cyan, magenta, and yellow, respectively. The toners of the respective colors develop the electrostatic latent images formed on the photoreceptor drums 11, thereby reproducing the converted document-image-information of the respective colors into color toner images.

Provided beneath the image forming section 1 is a feeding mechanism 17, which separates and supplies, one at a time, the recording media stacked and stored in a sheet tray 18. Resist rollers 19 control the timing of transporting a recording media to the image forming units Pa through Pd after the recording medium is separated by and supplied from the feeding mechanism 17.

Provided beneath the image forming units Pa through Pd is a transport-transfer belt mechanism 20, which includes a driving roller 21, a follower roller 22, a transfer-transport belt 23, a recording medium attracting charger 24, and a charge remover (not shown), etc. The transport-transfer belt mechanism 20 transports an incoming recording medium by attracting it onto the transfer-transport belt 23 by static electricity. The transfer-transport belt 23 is driven in a direction of arrow A shown in FIG. 2 by the friction with the driving roller 21.

The recording medium attracting charger 24 charges a surface of the transfer-transport belt 23 to attract the recording medium onto the transfer-transport belt 23 after the recording medium is ejected through the resist rollers 19. In this way, the recording medium does not move out of position on the belt when it is transported. The recording medium on which images are formed by the image forming units Pa through Pd is separated from the transfer-transport belt 23 by an AC current applied to the charge remover.

A fixing device 25, provided opposite the resist rollers 19 with the transport-transfer belt mechanism 20 in between, is used to fix the transferred images on the recording medium. The recording medium passes through a nip portion between fixing rollers of the fixing device 25. Ejection rollers 27 eject the recording medium, via a transport guide 26, onto an ejection tray 28 provided on an external wall of the image forming section 1.

The recording medium used in the color image forming apparatus of the foregoing structure is a cut sheet of paper. When the recording medium is supplied into a guide in a sheet feeding path of the feeding mechanism 17, a sensor (not shown) detects the front end of the recording medium and outputs a detection signal. Based on the detection signal from the sensor, the resist rollers 19 stop the recording medium temporarily. The recording medium is then transported onto the transfer-transport belt 23 rotating in a timed manner with the image forming units Pa through Pd. Here, the transfer-transport belt 23 is charged with the charger 24, which makes it possible to stably transport the recording medium through the image forming units Pa through Pd.

The image forming units Pa through Pd form toner images of the respective colors, which are overlaid on the recording medium being transported by electrostatic attraction on the transfer-transport belt 23. After the transfer, the charger remover removes the recording medium, from the front end to the rear end, from the transfer-transport belt 23. The recording medium is then guided into the fixing device 25 and ejected onto the ejection tray 28.

It should be noted that the photoelectric converting element 45 used in the color image forming apparatus of the foregoing structure is a CCD line sensor, and successively carries out photoelectric conversion of focused light images into output electrical signals. The CCD line sensor is a color sensor with three lines, capable of outputting separate line data of respective color components R (Red), G (Green), and B (Blue) read from a black-and-white image or color image.

The double-sided auto document feeder 3 may be a single-sided auto document feeder. Further, instead of the laser beam scanner section 13 of the image forming units Pa through Pd, an optical system (LED) head composed of a light-emitting diode array and a focusing lens array may be used to write a light image on the photoreceptor. The LED head is smaller and produces less noise (LED head has no moving parts) than the laser scanner section. Therefore, the LED head can be suitably used in electrophotographic image forming apparatuses of a tandem type requiring multiple photo writing units.

The foregoing color image forming apparatus uses a gear driving system for the rotation of the photoreceptor drum 11 and other transport rollers to transmit the output of the motor (driving source) to driving targets, including the photoreceptor drum 11 and transport rollers.

By manufacturing the gear driving system with a gear-driving-system designing method of the present invention, the gear driving system can reduce oscillation to carry out high-quality image printing.

For example, the gear-driving-system designing method of the present invention may be used to design a gear driving system used for a driving section of the image forming section 1 for rotating the photoreceptor drum 11. In this case, the product gear driving system can suppress non-uniformity in the peripheral velocity of the photoreceptor drum 11 caused by oscillation. In addition, unevenness in charging, exposure, and development can be effectively reduced. As a result, print unevenness known as "pitch unevenness" can be avoided in, for example, halftone printing.

In the following, description is made as to a gear-driving-system designing system employing the gear-driving-system designing method according to the present invention.

Figure 1:
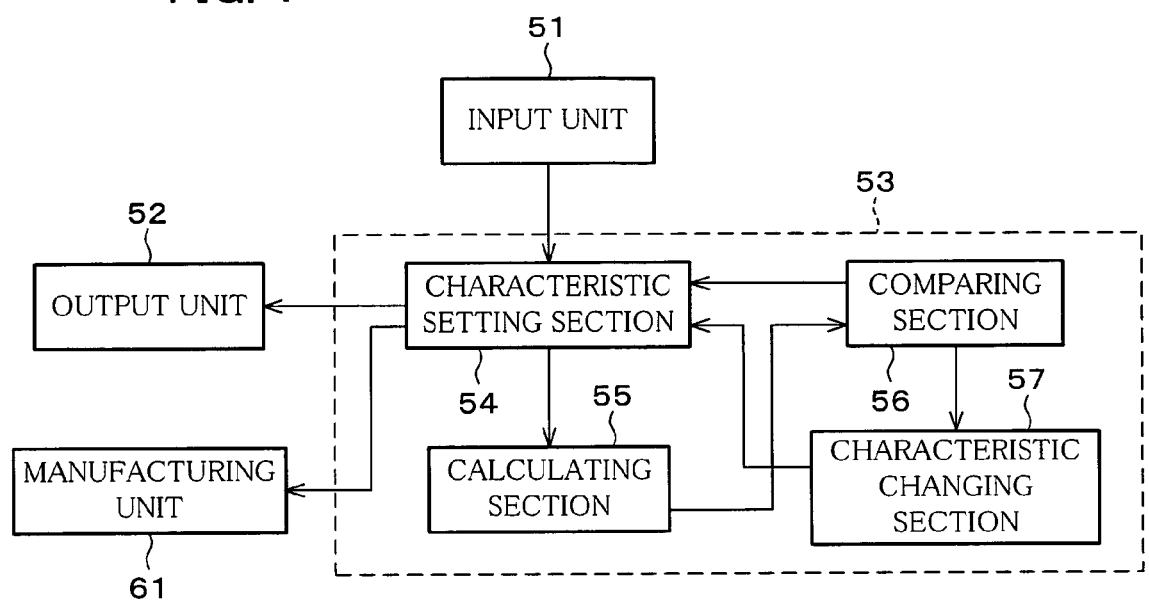
FIG. 1 is a block diagram showing a structure of a gear-driving-system designing system according to one embodiment of the present invention.

As illustrated in FIG. 1, the gear-driving-system designing system includes an input unit 51, an output unit 52, and an arithmetic unit 53 provided in a computer. The input unit 51, the output unit 52, and the arithmetic unit 53 may be realized by a computer, or externally connected to the gear-driving-system designing system. The results of arithmetic operations in the gear-driving-system designing system are outputted as design conditions to a manufacturing unit 61. Based on the design conditions, the manufacturing unit 61 manufactures a gear driving system.

The input unit 51 supplies data to the arithmetic unit 53. The output unit 52 outputs the result of calculation, for example in the arithmetic unit 53, to display means or printing means, etc.

The arithmetic unit 53 includes a characteristic setting section 54, a calculating section 55, a comparing section 56, and a characteristic changing section 57. The functions of the characteristic setting section 54, the calculating section 55, the comparing section 56, and the characteristic changing section 57 are realized by a computer reading a program stored in a computer-readable recording medium.

The characteristic setting section (setting section) 54 sets characteristics of each gear in the gear driving system being designed.

Some of the gear characteristics set by the characteristic setting section 54 include: acceptable range of pitch distance between an input gear and a final gear; acceptable range of reduction ratio in the final gear; output torque of the final gear; the number of revolutions and the module of the input gear; and the number of reduction gears. These characteristics ("initially set characteristics" hereinafter) are set based on the input from the input unit 51. Other characteristics set by the characteristic setting section 54 include: the number of revolutions of the final gear; the number of teeth on each gear; tooth width; tooth strength; tooth material; tooth durability; and the diameter, length, and the supporting method of a gear supporting shaft. These characteristics ("design condition characteristics" hereinafter) are set based on the result of calculation by the calculating section 55. Note that, the input gear is the first gear that transmits the output of the driving source to the gear driving system. The final gear is the last gear in the gear driving system that outputs the transmitted driving force to the driving target.

The calculating section (calculator, equation generator, equation solver) 55 operates in conjunction with the comparing section 56 and the characteristic changing section 57 to calculate, based on the initially set characteristics set by the characteristic setting section 54, design condition characteristics that give optimum gear conditions.

More specifically, the design condition characteristics calculated by the calculating section 55 are evaluated in the comparing section (judging section) 56 as to whether the design condition characteristics satisfy the initially set characteristics. If No, the characteristic changing section (setting changing section) 57 changes the characteristics set in the characteristic setting section 54, according to the output of the calculating section 55. This process is repeated until optimum gear characteristics are obtained, i.e., until the design condition characteristics calculated in the calculating section 55 satisfy the initially set characteristics.

Figure 3:
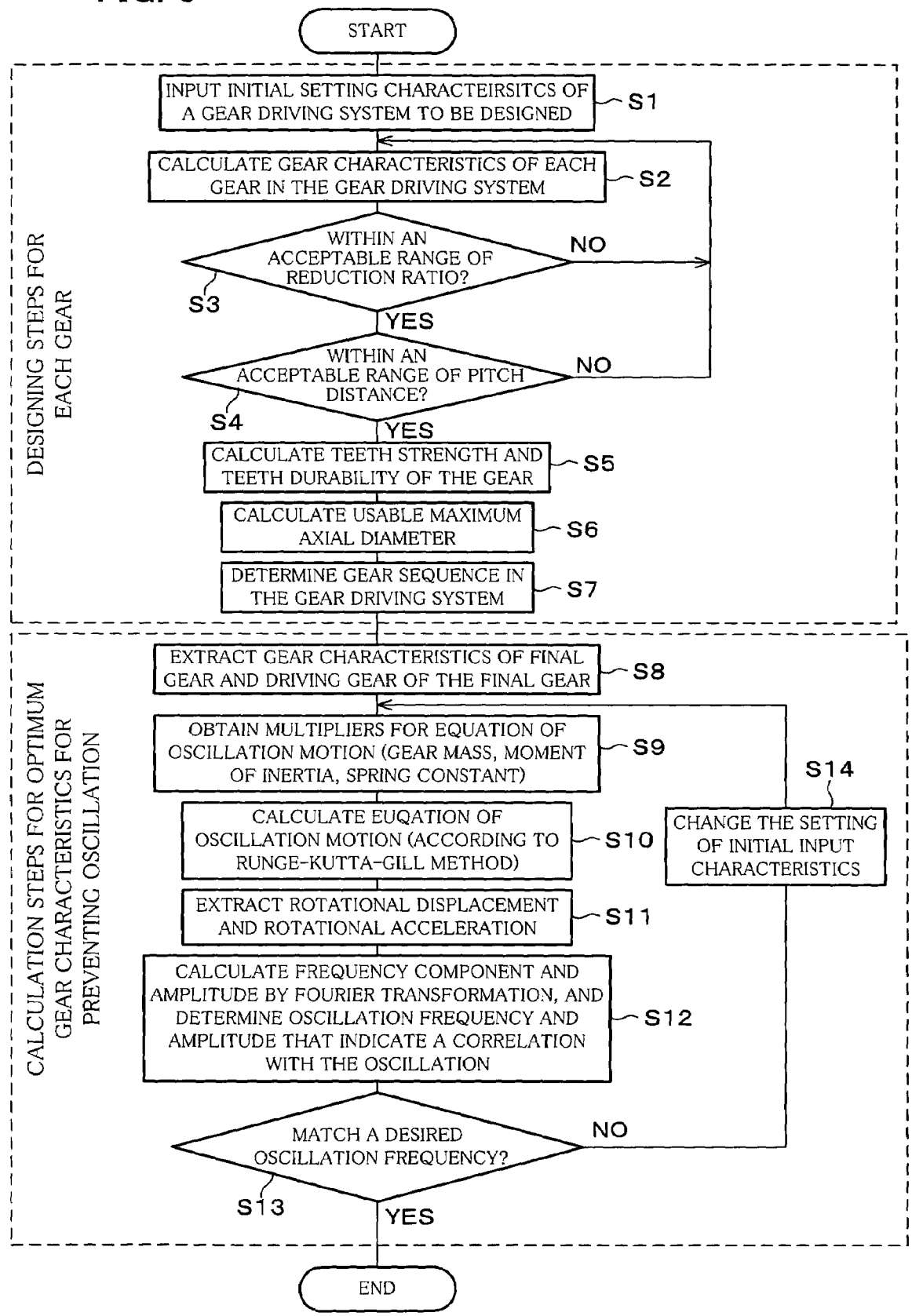
FIG. 3 is a flowchart showing operations of the gear-driving-system designing system.

Referring to the flowchart of FIG. 3, the following describes the processes of arithmetic operations in the arithmetic unit 53 of the gear-driving-system designing system.

In the present embodiment, the arithmetic operations in the arithmetic unit 53 can be divided into two major processes. The first process is steps S1 through S7 in FIG. 3 (designing steps for each gear), in which arithmetic operations are successively carried out to design each gear of the driving system. The second process is steps S8 through S14 (calculation steps for optimum gear characteristics for preventing oscillation), in which arithmetic operations are carried out to obtain values of optimum gear characteristics for preventing oscillation in the final gear and the driving gear.

In S1, the input unit 51 outputs, to the characteristic setting section 54, initially set characteristics for the gear driving system being designed by the gear-driving-system designing system. Here, the initially set characteristics include, for example, the number of revolutions and the module of the input gear, acceptable range of pitch distance between the input gear and the final gear, acceptable range of reduction ratio in the final gear, output torque of the final gear, and the number of reduction gears.

In S2, desired gear characteristics are calculated for each gear in the gear driving system, starting from the gear coupled to the input gear. The calculation is carried out by the calculating section 55. Alternatively, in this step, the calculation may be carried out upstream from the final gear. In this case, output characteristics required for the calculation are outputted to the final gear of the driving system.

In S3, the calculating section 55 calculates a reduction ratio of the final gear based on gear characteristics of the final gear calculated in S2. The comparing section 56 then determines whether the reduction ratio is within an acceptable range. If No, the sequence returns to S2 to calculate gear characteristics again.

If the reduction ratio of the final gear is within the acceptable range, the calculating section 55 in S4 calculates a pitch distance between the input gear and the final gear based on the gear characteristics of the final gear calculated in S2. Further, the comparing section 56 in S4 determines whether the pitch distance is within an acceptable range. If No, the sequence returns to S2 to calculate gear characteristics again.

If No in S3 or S4, and when gear characteristics are calculated again in S2, the characteristic changing section 57 changes any of the currently set gear characteristics in the characteristic setting section 54, before recalculating gear characteristics. The process of changing the gear characteristics is carried out according to a predetermined program, so that the calculation gives a more desirable result after the change (the reduction ratio or pitch distance that did not fall in the acceptable range in S3 or S4 are changed to obtain a value within the acceptable range).

If Yes in S4, the teeth strength and teeth durability of each gear are calculated in S2 according to the gear characteristics obtained in S2. In S6, a maximum axial diameter usable in each gear is calculated. These calculations are carried out in the calculating section 55.

In S7, a sequence of gear train in the gear driving system is determined from the gear characteristics inputted as initially set characteristics, and from the gear characteristics of each gear calculated in S2. The gear characteristics of each gear of the gear driving system, with the gear sequence so determined, may be outputted to the output device 52 at this instant.

As described, the arithmetic process in S1 through S7 provides designing steps for calculating a gear sequence of the gear driving system, and gear characteristics of each gear in the gear driving system. It should be noted here that such designing steps are already established and have been available conventionally. Such a conventional arithmetic method may be used for the designing steps of each gear in the gear-driving-system designing system of the present invention.

However, the gear driving system designed by the conventional method does not take into account reducing oscillation caused in actual driving. Accordingly, the gear driving system designed by such a method may cause the problem of oscillation in a device using the gear driving system.

In light of this problem, in the gear-driving-system designing method of the present embodiment, the output result of the designing steps for each gear is used for the arithmetic operations in the steps of calculating optimum gear characteristics to obtain optimum gear characteristics that take into account preventing oscillation.

Note that, the steps of calculating optimum gear characteristics for preventing oscillation may be carried out for all gears, from the input gear to the final gear.

However, the oscillation caused in the driving target can be suppressed almost completely only by preventing oscillation in the final gear pair (a pair of the final gear and the driving gear therefor). It is therefore most efficient to carry out calculations only for the final gear pair in the steps of calculating optimum gear characteristics for preventing oscillation. In the gear-driving-system designing system of the present embodiment, the process of S8 through S14 is carried out only for the final gear pair.

In the steps of calculating optimum gear characteristics for preventing oscillation, only the gear characteristics of the final gear pair are extracted in S8 from the gear characteristics of individual gears obtained in the designing steps for each gear. The gear characteristics extracted in S8 are numerical values required to set up an equation of oscillation motion calculated in S10, and are set as initial input characteristics in the characteristic setting section 54. Examples of the gear characteristics extracted in this step include the number of teeth, module, twist angle, pressure angle, and tooth width.

Step S9 calculates multipliers used in the equation of oscillation motion, as will be described later. The multipliers are, for example, gear mass, moment of inertia, and spring constant of each of the final gear and the final-gear driving gear. The gear mass and moment of inertia may be calculated from the shape and material of the gear specified by the gear characteristics extracted in S8, using known physical formulae. The axial spring constant may be calculated from an amount of flexure under load, using a formula of flexure according to material dynamics. The spring constant, acting between the teeth of the gear, is a multiplier that varies as a function of time. The spring constant is obtained by first calculating the rigidity of the teeth from the start to end of gear engagement using a known formula, and then by converting the result of calculation into a sinusoidal wave by Fourier transformation. Note that, each multiplier obtained in S9 may be outputted to, for example, the output unit 52. This enables a designer to check the magnitude of multiplier to see whether or not the model has been properly set.

In S10, the multipliers obtained in S9 are used to set up an equation of oscillation motion for the final gear pair, and the equation is solved according to the Runge-Kutta-Gill method, for example.

Figure 4:
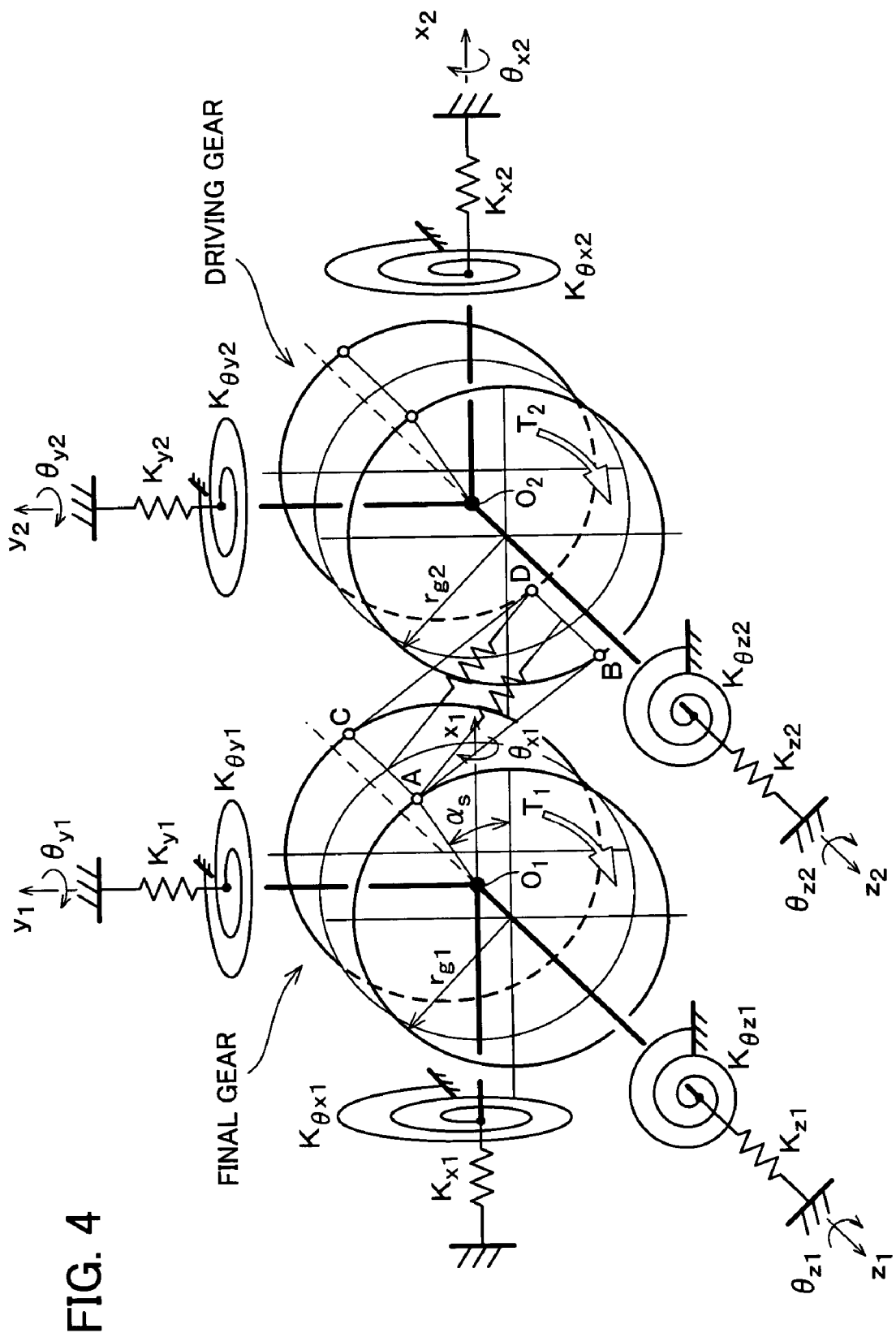
FIG. 4 is a perspective view illustrating a model of an oscillation system on which the gear-driving-system designing system performs arithmetic operations.

The equation of oscillation motion in S10 is described below. In the present embodiment, the final gear and the driving gear are modeled as cylinders that are joined to each other with springs, as shown in FIG. 4. In the model shown in FIG. 4, the two cylinders have central axes parallel to each other, and the axial direction parallel to the central axis is defined as a z-axis. The axial direction within a plane of the central axis and perpendicular to the z-axis is an x-axis, and the axial direction perpendicular to the x-axis and z-axis is a y-axis.

That is, the final gear is a cylinder with radius $r_{g1}$, and experiences torque $T_1$ in a direction of the arrow within an x-y plane during driving. Further, the final gear experiences forces of coil springs with spring constants $K_{\theta x1}$, $K_{\theta y1}$, and $K_{\theta z1}$ in directions of rotation around the x-, y-, and z- axes, respectively. The final gear also experiences forces of springs with spring constants $K_{x1}$, $K_{y1}$, and $K_{z1}$ in directions of movement parallel to the centrobaric x-, y-, and z- axes, respectively. The calculated values of S9 are used as the values of the spring constants.

Similarly, the driving gear is a cylinder with radius $r_{g2}$, and experiences torque $T_2$ in a direction of the arrow within an x-y plane during driving. Further, the driving gear experiences forces of coil springs with spring constants $K_{\theta x2}$, $K_{\theta y2}$, and $K_{\theta z2}$ in directions of rotation around the x-, y-, and z- axes, respectively. The driving gear also experiences forces of springs with spring constants $K_{x2}$, $K_{y2}$, and $K_{z2}$ in directions of movement parallel to the centrobaric x-, y-, and z- axes, respectively.

The driving gear also experiences a force (torque T2 in the model shown in FIG. 4) from the preceding gear of the gear driving system. In this model, the final gear and the driving gear exert force on each other by being coupled together with springs (each with a spring constant that acts between the teeth of the gear). The torque T2 and the spring constant acting between the teeth of the gear are incorporated into {F} on the right-hand side of Equation (1) below, which represents an equation of oscillation motion.

The equation of oscillation motion obtained by the foregoing model may be used to calculate a change in behavior of oscillation in the final gear as a function of time. The equation of oscillation motion is expressed by Equation (1) below.

$$[m]\{\ddot{\delta}\} + [k]\{\delta\} = \{F\} \quad (1)$$

where m is a mass, δ is a displacement, and F is a weight. The symbols [m] and [k] denote mass and rigidity matrix, respectively, derived from the model shown in FIG. 4.

In the present embodiment, in order to calculate a frequency spectrum of oscillation, the equation of oscillation motion is calculated according to the Runge-Kutta-Gill method to obtain a change over time of the oscillation system as represented by the foregoing model. Note that, the calculation of frequency spectrum of oscillation is carried out by the process in S11 through S12 in the flowchart of FIG. 3.

In S11, the rotational displacement and rotational acceleration obtained by solving the equation of oscillation motion are extracted for each of the final gear and the driving gear. The displacement and acceleration extracted in S11 may be supplied to, for example, the output unit 52. This enables a designer to check the magnitudes of displacement and acceleration to see whether the model has been properly set. It should be noted that, in addition to the rotational displacement and rotational acceleration, S11 may calculate translational displacement and translational acceleration along the x-, y-, and z-axes. However, since the aim of present invention is to analyze pitch unevenness in a transferred image from the photoreceptor, the present invention only calculates rotational displacement and rotational acceleration that affect the image.

In S12, the displacement and acceleration extracted in S11 are used in Fourier transformation to find a frequency component and its amplitude in the final gear. Based on the frequency component and amplitude so obtained, an oscillation frequency and amplitude that have a correlation with the oscillation in the gear driving system are obtained. Note that, by the nature of Fourier transformation, the value of amplitude obtained herein is not an absolute value. Rather, the amplitude actually calculated is relative amplitude intensity (dimensionless value).

In this manner, the gear-driving-system designing system of the present embodiment outputs a frequency component amplitude of the final gear, making it possible to easily find a characteristic oscillation frequency of the oscillation. Note that, the process of S11 and S12 is carried out by the calculating section 55.

In S13, the calculating section 55 outputs the oscillation frequency and amplitude obtained in S12 to the comparing section 56. The oscillation frequency and amplitude are then compared with desired oscillation frequency and amplitude in the comparing section 56. If the calculated oscillation frequency is equal to or smaller than the desired oscillation frequency, or if the calculated oscillation amplitude is equal to or smaller than the desired amplitude, the system judges that the oscillation generated in the designed gear driving system is within an acceptable range, and the process is finished. Note that, desired oscillation frequency and amplitude may be entered through the input unit 51 by a designer, or may be pre-defined in a program used to operate the gear-driving-system designing system.

If the oscillation frequency and amplitude obtained in S12 are both greater than the desired oscillation frequency and amplitude in S13, a change is made in S14 to the characteristics that was set in S8 as initial input characteristics. Then, the sequence returns to S9 to repeat the process of S9 through S13. In S14, a change is made by resetting the currently set gear characteristics in the characteristic setting section 54, under the control of the characteristic changing section 57.

The change in S14 may be carried out automatically by a program operating the gear-driving-system designing system, or may be carried out according to user instructions entered through the input unit 54.

In this manner, as soon as the oscillation frequency and/or amplitude become smaller than desired values in S13, the gear characteristics set in the characteristic setting section 54 are outputted as optimum gear characteristics for preventing oscillation in the gear driving system.

As described, with the gear-driving-system designing system of the present embodiment, it is possible to obtain gear characteristics that produce desired oscillation frequency and amplitude for the oscillation of the final gear, without actually manufacturing the driving system.

Figure 5:
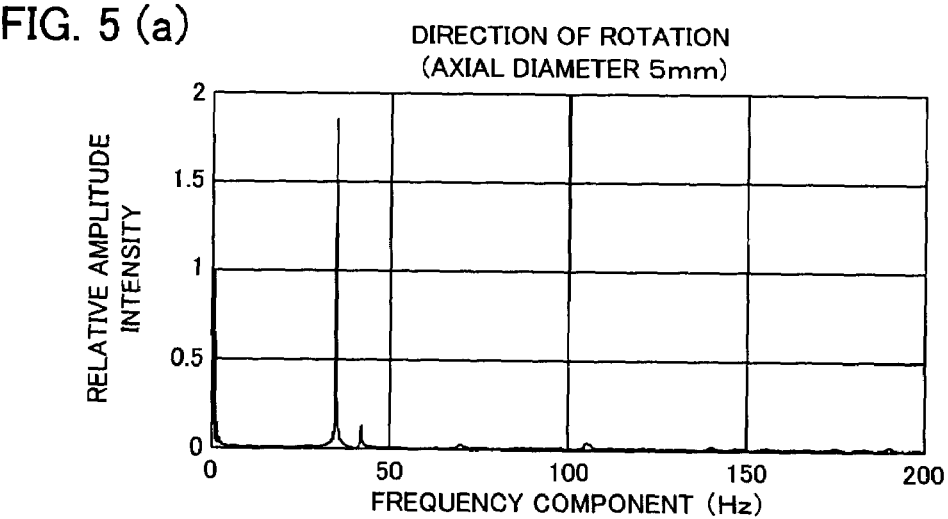
FIG. 5(*a*) through FIG. 5(*c*) are graphs representing one example of a result of arithmetic operations by the gear-driving-system designing system, showing a frequency spectrum of a final gear when the axial diameter of the final gear is varied.
Figure 5:
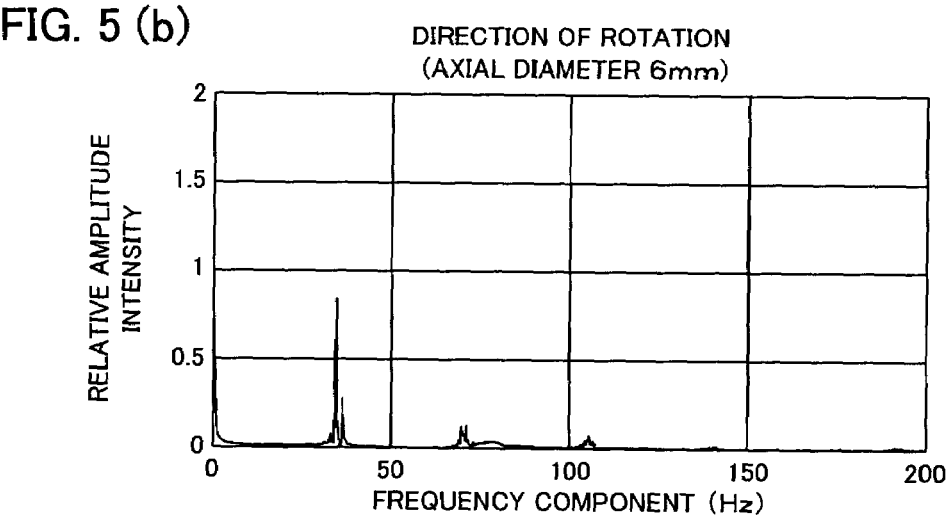
Figure 5:
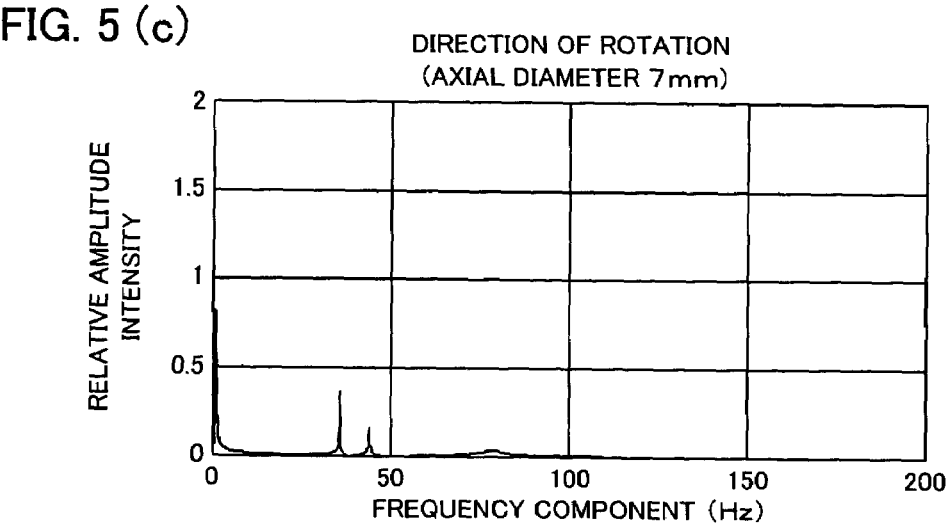

Referring to FIG. 5, the following describes one example of the result obtained according to the foregoing processes.

FIG. 5(a) through FIG. 5(c) show frequency spectra of rotational oscillations in the final gear, when the axial diameter of the final gear is 5 mm, 6 mm, and 7 mm, respectively. In FIG. 5(a) through FIG. 5(c), the horizontal axis indicates frequency component, and the vertical axis indicates amplitude (relative amplitude intensity).

It is assumed here that the frequency spectrum shown in FIG. 5(a) was calculated based on the gear characteristics (initial input characteristics) that were extracted in S8 and that do not take into account preventing oscillation. In FIG. 5(a), the largest amplitude is obtained when the frequency component is about 35 Hz. Here, the oscillation frequency is about 35 Hz, and the amplitude at this frequency is about 1.3 mm.

If the oscillation frequency and amplitude both exceed desired values, any of the gear characteristics set as a parameter in the characteristic setting section 54 is changed, and the new gear characteristic is used to calculate a frequency spectrum again. Here, the parameter whose setting is changed is assumed to be the axial diameter of the final gear. FIG. 5(b) and FIG. 5(c) show frequency spectra that were calculated again after changing the setting of the axial diameter of the final gear.

As can be seen from FIG. 5(a) through FIG. 5(c), the spectrum component of the frequency that causes oscillation becomes smaller when the axial diameter of the final gear is increased. In other words, the amplitude of the oscillation caused in the gear driving system becomes smaller when the axial diameter of the final gear is increased. It follows from this that the axial diameter of the final gear should preferably be large, because it enables a gear driving system to be designed in which oscillation is suppressed, without using a helical gear or a gear with a small module for the final gear.

It should be noted that the parameter whose setting is changed to recalculate the frequency spectrum is not just limited to the axial diameter of the final gear described in the foregoing example. In order to recalculate the frequency spectrum, any gear characteristic may be selected as a parameter whose setting is changed, provided that the oscillation frequency or amplitude is reduced as a result of the change. In other words, by considering a change in frequency spectrum of the oscillation in the final gear in response to a change in gear characteristics, desirable characteristic values can also be obtained for the other gear characteristics as well, as for the axial diameter of the final gear selected as a parameter.

Referring to FIGS. 6(a) and 6(b) and FIGS. 7(a) and 7(b), the following describes results of evaluation on the validity of a simulation in the foregoing gear-driving-system designing system. In FIGS. 6(a) and 6(b) and FIGS. 7(a) and 7(b), the horizontal axis indicates frequency (spatial frequency in FIG. 6(a)), and the vertical axis indicates relative amplitude intensity.

FIG. 6(a) shows the result of measurement of the frequency spectrum of the oscillation caused in the actual gear driving system used in an image forming apparatus, prior to changing the gear characteristic value. FIG. 6(b) shows a frequency spectrum that was obtained by the calculations according to the gear-driving-system designing system of the present embodiment, using the gear characteristic value of the actual gear driving system. In FIG. 6(a), the legend "Frequency [1 p/mm]" along the horizontal axis is a spatial frequency. The frequency is obtained by multiplying the spatial frequency with the process speed (88 mm/s in this example).

Figure 7:
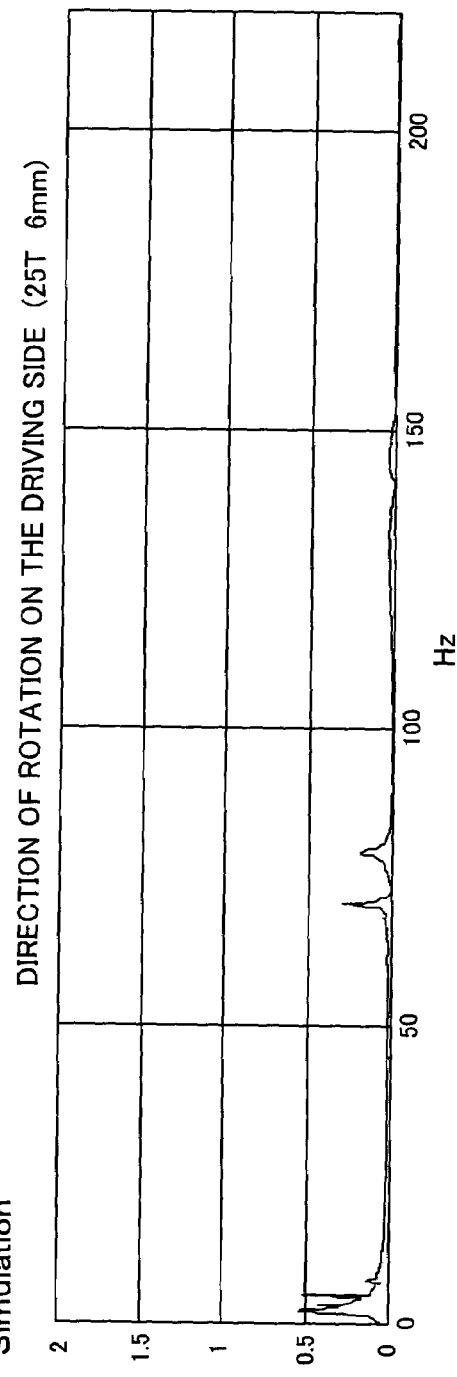
FIG. 7(*a*) is a graph showing a simulation result of a frequency spectrum based on an optimum gear characteristic value obtained in the gear-driving-system designing system.
Figure 7:
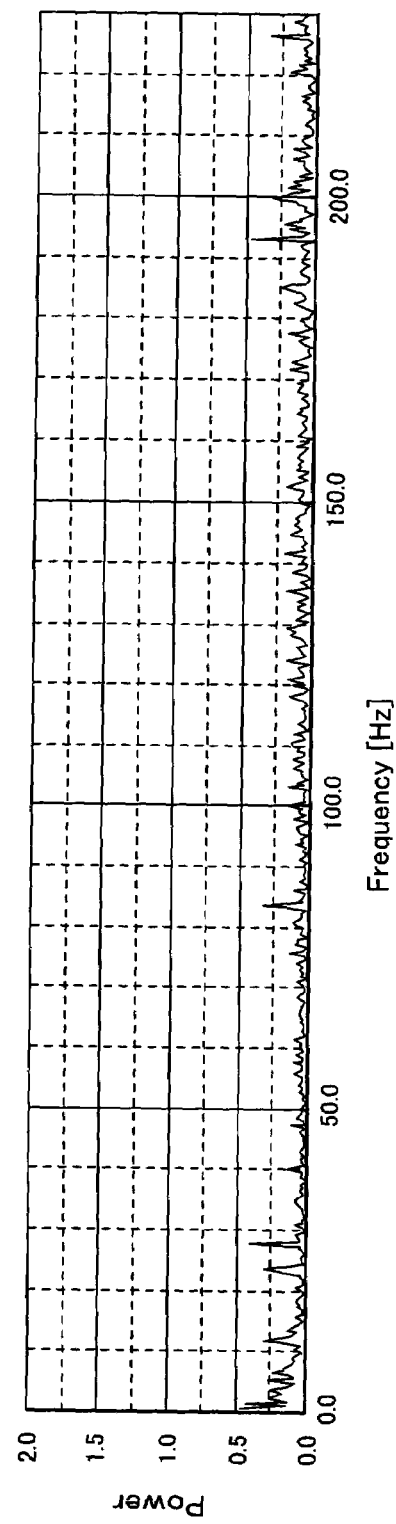
Figure 8:
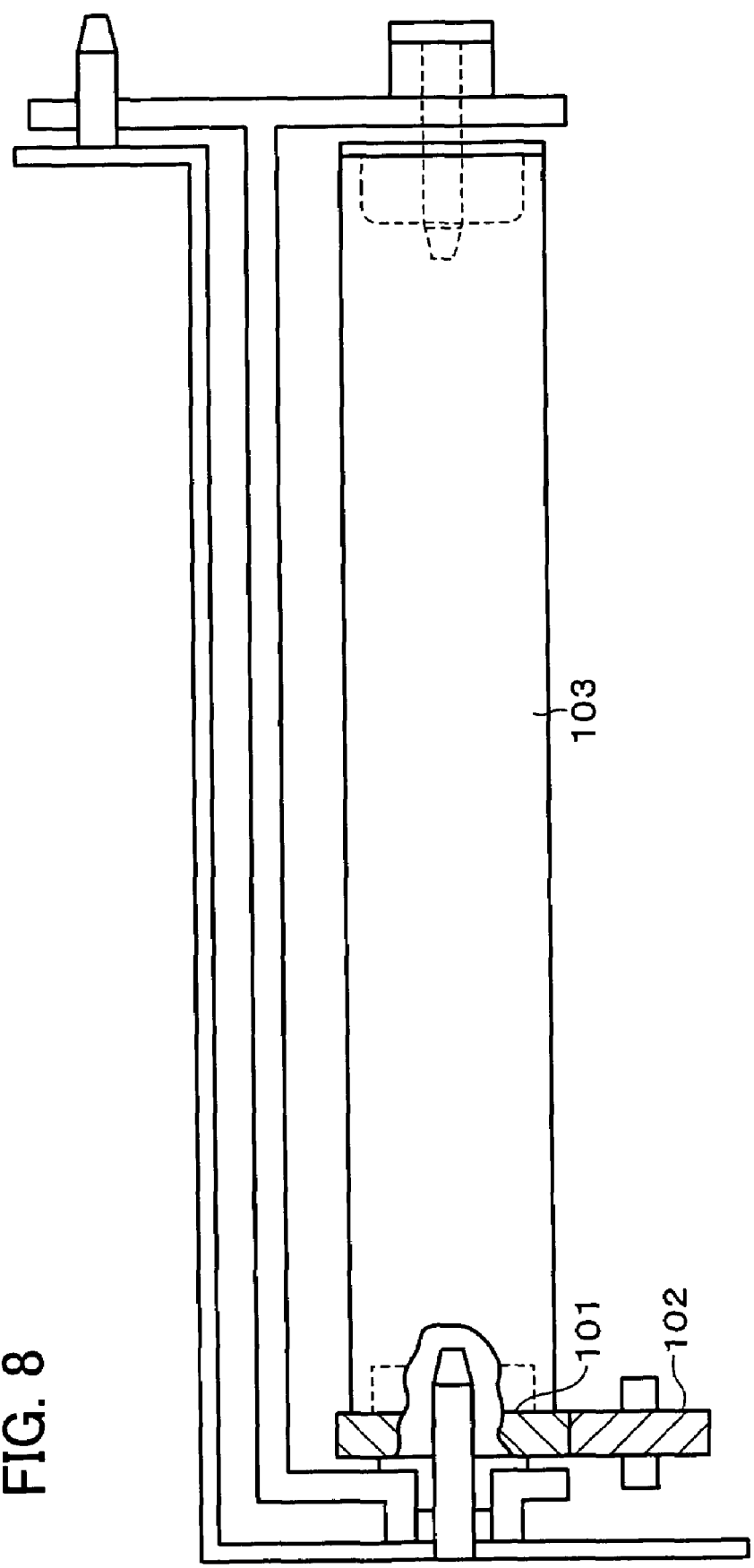
FIG. 8 is a cross sectional view showing a gear driving system of one conventional example.
Figure 9:
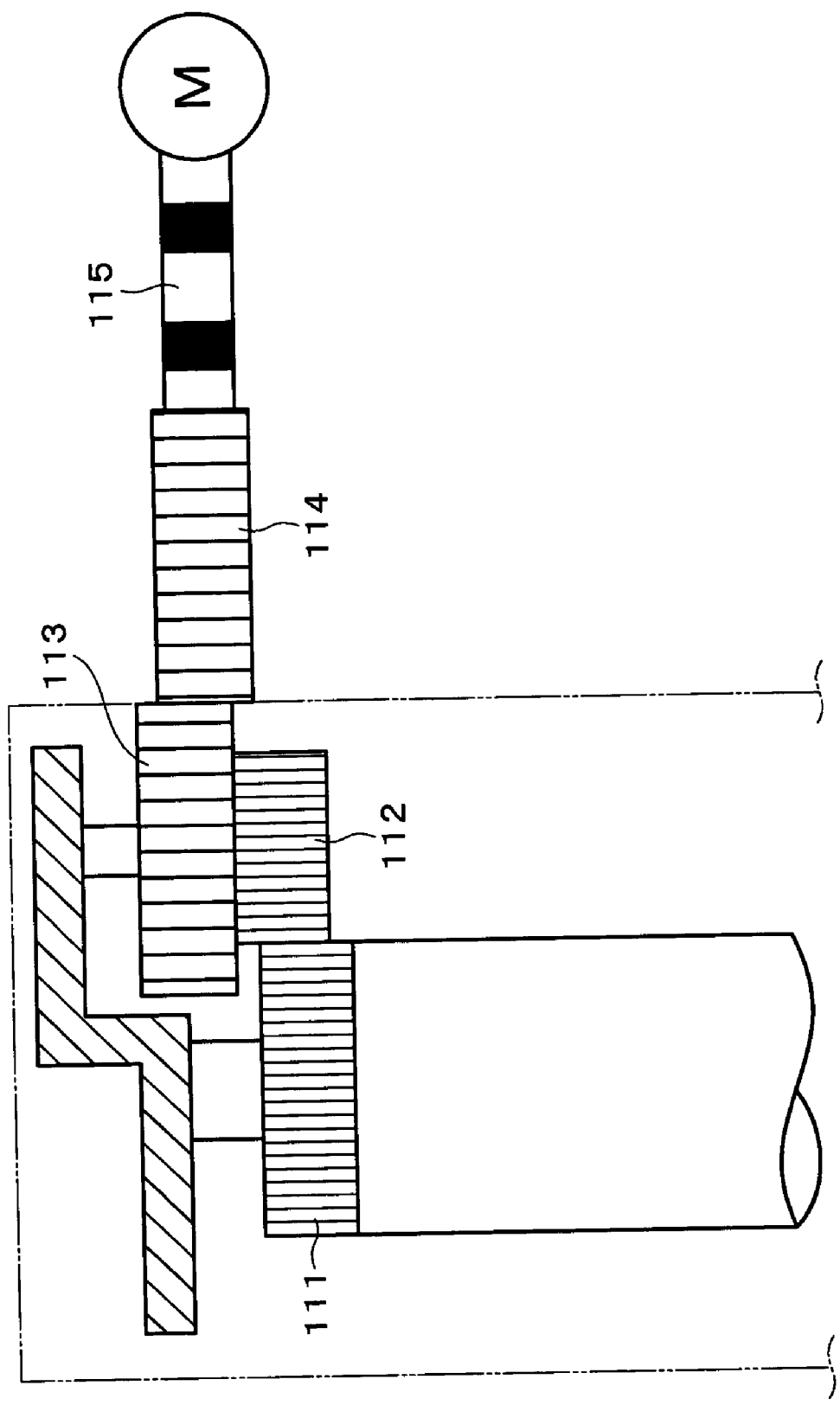
FIG. 9 is a cross sectional view showing a gear driving system of another conventional example.

FIG. 7(a) shows a frequency spectrum that was obtained by the calculations according to the gear-driving-system designing system of the present embodiment, using a desirable gear characteristic value obtained in the gear-driving-system designing system. FIG. 7(b) shows the result of measurement of the frequency spectrum of the oscillation caused in the gear driving system that was actually manufactured using the gear characteristic value obtained in the gear-driving-system designing system.

As can be seen from FIGS. 6(a) and 6(b) and FIGS. 7(a) and 7(b), the frequency spectrum obtained by the gear-driving-system designing system of the present embodiment strongly matches the experimental result, thereby confirming the validity of the gear-driving-system designing system of the present embodiment.

By comparing FIGS. 6(a) and 6(b) with FIGS. 7(a) and 7(b), it is apparent that the oscillation caused in the final gear of the driving system can be suppressed, and that the image quality of the image forming apparatus can be improved, by forming the gear driving system of the image forming apparatus using the gear characteristic value obtained by the gear-driving-system designing system of the present invention.

In designing the gear driving system with the foregoing gear-driving-system designing system, gear characteristics are calculated by simulating the behavior of oscillation in the final gear. This enables the optimum gear characteristics to be obtained that can prevent oscillation, without actually manufacturing the image forming apparatus. As a result, the gear driving system can be designed both easily and efficiently.

※Note that, the foregoing embodiment described the gear-driving-system designing system in which the arithmetic process is a two-step process, including the designing steps for each gear, and the calculation steps for optimum gear characteristics for preventing oscillation. However, the gear-driving-system designing system of the present invention is required to include at least the calculation steps for optimum gear characteristics for preventing oscillation. When the gear-driving-system designing system of the present invention includes only the calculation steps for optimum gear characteristics for preventing oscillation, the setting input characteristics set in the characteristic setting section 54 may be directly inputted by a designer through the input unit 51.

Further, the foregoing embodiment described the gear-driving-system designing system for designing the gear driving system in an image forming apparatus.

However, the present invention is not just limited to this embodiment, and is applicable to designing of other gear driving systems as well.

The present invention includes a program for causing a computer to operate as the respective means of the gear-driving-system designing system of the present invention. The invention also includes a computer-readable recording medium in which such a program is recorded.

For processing in a microcomputer, the recording medium may be a memory (not shown) such as program media like ROM (Read Only Memory), or may be other types of readable program media that are read by being inserted in a program reading device realized by an external memory device.

In either case, the stored program may be accessed and run by a microprocessor, or may be read and downloaded into a program storage area (not shown) of a microcomputer. In the latter case, the downloaded program is stored beforehand in a main apparatus.

The program media may be storage media that statically carry a program. Examples of such program media include: tapes such as a magnetic tape and cassette tape; magnetic disks such as a floppy disk and hard disk; optical disks such as a CD-ROM, MO, MD, DVD; cards such as IC cards (including memory cards); and semiconductor memories such as a mask ROM, EPROM (Erasable Programmable Read Only Memory), and flash ROM.

Further, in the present embodiment, the program media may dynamically carry a program in a system structure of a communications network including the Internet, so that the program can be downloaded via the communications network. In this case, the downloaded program may be stored beforehand in a main apparatus, or may be installed from a different recording medium.

As described, a gear-driving-system designing system of the present invention includes: a setting section for setting a gear characteristic value for a gear driving system; a calculating section for simulating an oscillation caused in a final gear of the gear driving system, based on the gear characteristic value set in the setting section; a judging section for judging whether or not the oscillation in the final gear determined by the simulation in the calculating section is within an acceptable range; and a setting changing section for changing the gear characteristic value set in the setting section, when the judging section judges that the oscillation in the final gear does not fall within the acceptable range.

According to this configuration, recognizing that the gear characteristic value set in the gear setting section does not take into account preventing oscillation caused in the gear driving system, the gear-driving-system designing system changes the gear characteristic value to a value that takes into account preventing oscillation in the gear driving system.

Specifically, the calculating section simulates an oscillation in the final gear of the gear driving system, based on the gear characteristic value currently set in the setting section. From the simulation result, the judging section judges whether or not the oscillation in the final gear is within an acceptable range.

If the oscillation in the final gear falls within the acceptable range, the gear characteristic value currently set in the setting section is used for output as the optimum gear characteristic that takes into account preventing oscillation. On the other hand, if the oscillation in the final gear does not fall within the acceptable range, the setting changing section changes the gear characteristic value set in the setting section.

The processes in the setting changing section, the calculating section, and the judging section are repeated until the judging section judges that the oscillation in the final gear is within the acceptable range. The gear characteristic value set in the setting section is outputted as the optimum gear characteristic when the oscillation in the final gear is judged to fall within the acceptable range. As a result, a gear driving system is designed that takes into account preventing oscillation.

With the gear driving system designed by the gear-driving-system designing system, oscillation can be suppressed for each gear of the gear driving system, without using a helical gear or a gear with a small module.

It is preferable in the gear-driving-system designing system that the calculating section includes: an equation creating section for creating an equation of oscillation motion for a predetermined oscillation system in the gear driving system, using the gear characteristic value set in the setting section; and an equation analyzing section for solving the equation of oscillation motion created by the equation creating section, so as to determine an oscillation frequency and an oscillation amplitude of the oscillation system, and that the judging section judges that the oscillation in the final gear is within the acceptable range when at least one of the oscillation frequency and the oscillation amplitude determined by the equation analyzing section fall within the acceptable range.

According to this configuration, the calculating section, using the gear characteristic value set in the setting section, creates an equation of oscillation motion for a predetermined oscillation system in the gear driving system. Then, the equation analyzing section solves the equation of oscillation motion to find a frequency and amplitude of the oscillation in the oscillation system. As a result, a characteristic oscillation frequency of the oscillation in the oscillation system can easily be grasped.

The judging section judges that the oscillation in the final gear is within the acceptable range when at least one of the oscillation frequency and the oscillation amplitude determined by the equation analyzing section fall within the acceptable range. Thus, the judging section readily carries out the judging process.

It is preferable in the gear-driving-system designing system that the oscillation system used in the equation creating section is a gear pair of the final gear and a driving gear of the final gear in the gear driving system.

According to this configuration, the processes in the setting changing section, the calculating section, and the judging section are carried out only for the gear pair of the final gear and the driving gear of the final gear. This reduces the number of gear characteristic values that need setting, thereby simplifying calculations. Further, the oscillation in the gear driving system can be suppressed almost completely by taking into account preventing oscillation only for the gear pair of the final gear and the driving gear. As a result, designing can be made more efficiently.

A gear-driving-system designing method of the present invention includes: a setting step of setting a gear characteristic value for a gear driving system; a calculating step of simulating an oscillation in a final gear of the gear driving system, based on the gear characteristic value set in the setting step; a judging step of judging whether or not the oscillation in the final gear determined by the simulation in the calculating step is within an acceptable range; and a setting changing step of changing and resetting the gear characteristic value set in the setting step, when the judging step judges that the oscillation in the final gear does not fall within the acceptable range, the setting changing step, the calculating step, and the judging step being repeated until the oscillation in the final gear is judged to fall within the acceptable range in the judging step, and the gear characteristic value being outputted as an optimum gear characteristic when the oscillation in the final gear is judged to fall within the acceptable range.

With this method, as with the gear-driving-system designing system, a gear driving system can be designed that takes into account preventing oscillation for each gear of the gear driving system, without using a helical gear or a gear with a small module.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A gear driving system designing system, comprising:
   a computer comprising:
      one or more processors;
      a memory storing a program logic; and
      a display terminal; and
   a manufacturing unit connected to the computer;
   the program logic comprising:
   a setting means for setting one or more gear characteristic values for the gear driving system, the gear characteristic values indicating characteristics of a final gear and a driving gear in the gear driving system for simulation of oscillations in the final gear of the gear driving system;
   a calculating means for simulating oscillations in the final gear of the gear driving system, based on the one or more gear characteristic values set by the setting means;
   a judging means for judging whether or not the simulated oscillations in the final gear determined by the calculating means are within acceptable ranges;
   a setting changing means for changing the one or more gear characteristic values set by the setting means, when the judging means judges that the simulated oscillations in the final gear do not fall within the acceptable ranges;
   means for causing said setting changing means, said calculating means, and said judging means to repeat their respective functions until the simulated oscillations in the final gear are judged to fall within the acceptable ranges by the judging means; and
   wherein when said judging means judges that the simulated oscillations in the final gear are within the acceptable ranges, the one or more gear characteristic values corresponding to the simulated oscillations are output from the designing system to a manufacturing unit for manufacturing the gear driving system or to the display terminal.

2. The gear driving system designing system as set forth in claim 1 wherein the calculating means includes:
   an equation creating means for creating equations of oscillation motion for a predetermined oscillation system in the gear driving system, using the one or more gear characteristic values set by the setting means;
   an equation analyzing means for solving the created equations of oscillation motion to determine a plurality of oscillation frequencies and a plurality of oscillation amplitudes of the oscillation system, and
   wherein the judging means judges that the simulated oscillations in the final gear are within the acceptable ranges when at least one of the plurality of oscillation frequencies and the plurality of oscillation amplitudes determined by the equation analyzing means falls within its plurality of acceptable ranges.

3. The gear driving system designing system as set forth in claim 2, wherein the oscillation system used in the equation creating means is a gear pair of the final gear and the driving gear of the final gear in the gear driving system.

4. The gear driving system designing system as set forth in claim 2, wherein the judging means judges that a simulated oscillation in the final gear is not within its acceptable range when both of the determined oscillation frequency and the determined oscillation amplitude of that simulated oscillation are determined to be outside their acceptable ranges.

5. The gear driving system designing system as set forth in claim 1, wherein when the setting changing means causes the changing of the one or more gear characteristic values set by the setting means, the setting changing means also causes the calculating means to simulate another set of oscillations in the final gear of the gear driving system, based on the changed one or more gear characteristic values and the judging means judges whether or not the simulated oscillations of the another set in the final gear determined by the calculating means are within an acceptable ranges and the setting changing means changes the one or more gear characteristic values, when the judging means judges that the simulated oscillations of the another set in the final gear do not fall within the acceptable ranges.

6. The gear driving system designing system as set forth in claim 5, further comprising an output means that outputs the one or more gear characteristic values set in the setting means when the judging means determines that the simulated oscillations are within the acceptable ranges or the changed one or more gear characteristic values when the judging means determines that the simulated oscillations of the another set are within the acceptable ranges.

7. The gear driving system designing system as set forth in claim 1, wherein a plurality of gear characteristic values are set by the setting means for the gear driving system.

8. The gear driving system designing system as set forth in claim 1, wherein:
the gear characteristic values include at least one of (i) number of teeth, (ii) module, (iii) twist angle, (iv) pressure angle, and (v) tooth width of each of the final gear and the driving gear of the final gear.

9. A computer implemented method for designing a gear driving system comprising:
a setting step of setting one or more gear characteristic values, for the gear driving system, the gear characteristic values indicating characteristics of a final gear and a driving gear in the gear driving system for simulation of oscillations in the final gear of the gear driving system;
a calculating step of simulating oscillations in the final gear of the gear driving system, based on the one or more gear characteristic values set in the setting step;
a judging step of judging whether or not the simulated oscillations in the final gear are within acceptable ranges;
a setting changing step of changing the one or more gear characteristic values previously set in the setting step, when the judging step judges that the simulated oscillations in the final gear do not fall within the acceptable ranges; and
wherein the setting changing step, the calculating step, and the judging step are repeated until the simulated oscillations in the final gear are judged to fall within the acceptable ranges in the judging step, and
when the simulated oscillations in the final gear being judged fall within the acceptable ranges, outputting the one or more gear characteristic values to a manufacturing unit for manufacturing the gear driving system or to a display terminal.

10. The computer implemented method as set forth in claim 9, wherein the calculating step includes:
an equation creating step of creating equations of oscillation motion for a predetermined oscillation system in the gear driving system, using the one or more gear characteristic values set in the setting step; and
an equation analyzing step of solving the equations of oscillation motion created in the equation creating step, to determine a plurality of oscillation frequencies and a plurality of oscillation amplitudes of the oscillation system, and
wherein it is judged in the judging step that the simulated oscillations in the final gear are within the acceptable ranges when at least one of the plurality of oscillation frequencies and the plurality of oscillation amplitudes determined by the equation analyzing step falls within its plurality of acceptable ranges.

11. The computer implemented method as set forth in claim 10, wherein the oscillation system used in the equation creating step is a gear pair of the final gear and the driving gear of the final gear in the gear driving system.

12. The computer implemented method as set forth in claim 10, wherein the judging step judges that a simulated oscillation in the final gear is not within its acceptable range when both of the determined oscillation frequency and the determined oscillation amplitude of that simulated oscillation are determined to be outside their acceptable ranges.

13. The computer implemented method as set forth in claim 9, wherein:
the gear characteristic values include includes at least one of (i) number of teeth, (ii) module, (iii) twist angle, (iv) pressure angle, and (v) tooth width of each of the final gear and the driving gear of the final gear.

14. A computer readable storage medium comprising computer executable instructions which when executed on a computer perform a process for designing a gear driving system, the medium comprising instructions for:
setting one or more gear characteristic values for a gear driving system, the gear characteristic values indicating characteristics of a final gear and a driving gear in the gear driving system for simulation of oscillations in the final gear of the gear driving system;
simulating oscillations in the final gear of the gear driving system, based on the one or more gear characteristic values set by said setting;
judging whether or not the simulated oscillations in the final gear are within acceptable ranges;
changing the one or more gear characteristic values previously set, when it is judged that the simulated oscillations in the final gear do not fall within the acceptable ranges;
wherein said setting, changing, simulating and judging are repeated until the simulated oscillations in the final gear are judged to fall within the acceptable ranges, and
when said judging judges that the simulated oscillations in the final gear are within the acceptable ranges, outputting the one or more gear characteristic values to a manufacturing unit for manufacturing the gear driving system or to a display terminal.

15. The computer readable storage medium as set forth in claim 14, wherein said simulating an oscillation includes:
creating equations of oscillation motion for a predetermined oscillation system in the gear driving system, using the one or more gear characteristic values set by the setting, and solving the created equations of oscillation motion to determine a plurality of oscillation frequencies and a plurality of oscillation amplitudes of the oscillation system; and judging the oscillations in the final gear as being within the acceptable ranges when at least one of the determined plurality of oscillation frequencies and the determined plurality of oscillation amplitudes of the oscillation system falls within its plurality of acceptable ranges.

16. The computer readable storage medium as set forth in claim 15, wherein the oscillation system used in the equation creating is a gear pair of the final gear and the driving gear of the final gear in the gear driving system.

17. The computer readable storage medium as set forth in claim 15, wherein said judging includes:

judging that a simulated oscillation in the final gear is not within its acceptable range when both of the determined oscillation frequency and the determined oscillation amplitude of that simulated oscillation are determined to be outside their acceptable ranges.

18. The computer readable storage medium as set forth in claim 14, further comprising instructions for:

causing said simulating to be repeated to simulate another set of oscillations in the final gear of the gear driving system, based on the changed one or more gear characteristic values;

causing said judging to be repeated to judge whether or not the simulated oscillations of the another set in the final gear are within an acceptable ranges; and in the case where it is judged that the simulated oscillations of the another set are not within the acceptable ranges, changing one or more of the gear characteristic values.

19. The computer readable storage medium as set forth in claim 18, further comprising instructions for:

in the case where it is judged that the simulated oscillations of the another set are within the acceptable ranges, outputting the changed one or more gear characteristic values on which the simulated oscillations of the another set were based to a manufacturing unit for manufacturing the gear driving system or to a display terminal.

20. The computer readable storage medium as set forth in claim 14, wherein:

the gear characteristic values include at least one of (i) number of teeth, (ii) module, (iii) twist angle, (iv) pressure angle, and (v) tooth width of each of the final gear and the driving gear of the final gear.

* * * * *